Nov. 16, 1965     J. D. STALTER     3,217,735
VALVE
Filed Dec. 18, 1963
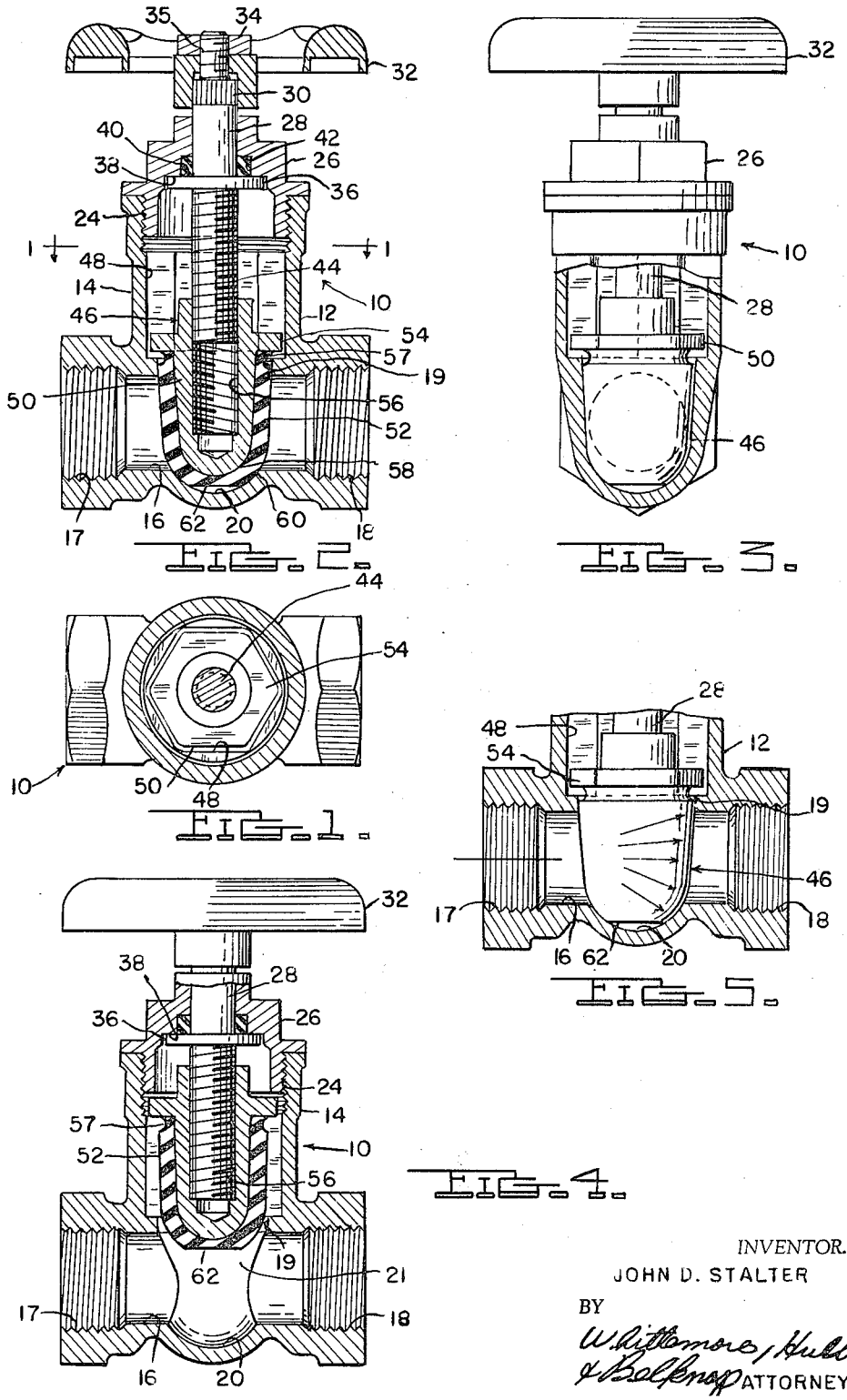
INVENTOR.
JOHN D. STALTER
BY
*Whittemore, Hulbert*
*& Belknap* ATTORNEYS

United States Patent Office 3,217,735
Patented Nov. 16, 1965

3,217,735
VALVE
John D. Stalter, Elkhart, Ind., assignor to Nibco, Inc., Elkhart, Ind., a corporation of Indiana
Filed Dec. 18, 1963, Ser. No. 331,507
1 Claim. (Cl. 137—329.05)

This invention relates to a fluid valve and is a continuation-in-part of my copending application (now abandoned), Serial No. 107,623, filed May 1, 1961 which in turn is a continuation-in-part of my application (now abandoned), Serial No. 16,513, filed March 21, 1960. More particularly, this invention relates to a gate valve which is adaptable for use in piping systems to stop or control movement of liquids or gases such as air, liquid fuels, fuel gases, oils or the like. This invention is characterized by its unique design which combines in one valve the full flow characteristic of a gate valve and the infinitely variable flow control feature of a globe valve.

A conventional globe valve per se is utilized for throttling fluid flow wherein the fluid is forced to make a double turn and pass through the circular opening created by raising or lowering the valve disc, at 90 degrees, to the axes of the pipe. A conventional gate valve, on the other hand, permits a straight line movement of fluid through the valve passage wherein the valve disc is moved completely out of the passage leaving a full opening which offers slight resistance to flow.

This invention provides a valve which permits a straight line movement of fluid through the valve passage by the movement of the valve completely out of the passage and which includes means for positioning the plunger at intermediate points in the passage so as to provide an infinitely variable flow control feature.

It is an object of the present invention to provide a valve having the full flow characteristic of a conventional gate valve and the infinitely variable throttling feature of a conventional globe valve.

Another object of the present invention is to provide a valve having a resiliently covered plunger which is adapted to move across a straight through flow passage to control the flow therethrough and which deforms under pressure when in a closed position to provide a tighter seal.

Still another object of the present invention is to provide a valve having a resiliently covered plunger which is adapted to move across a straight through flow passage to control the flow therethrough, said resilient cover extending completely across the flow passage when in a closed position and effective to provide a tighter seal as more line pressure is applied to the valve.

A further object of the present invention is to provide a valve comprising a body having a straight through flow passage having separated inlet and outlet portions and an elongated chamber located principally at one side of the flow passage intersecting the flow passage and extending beyond the other side of the flow passage, said chamber where it intersects the flow passage being of circular cross-section, having a diameter greater than that of the flow passage and defining a seating groove of concave circular cross-section below and at the sides of the flow passage, an actuatable elongated valve element of circular cross-section, at least the lateral surface portion of the valve element being formed of a yieldable sealing material, and a valve seat provided by a downstream surface portion of the chamber surrounding the intersection between the chamber and the outlet portion of the flow passage, said valve element having a substantially flat or slightly conical bottom surface which is spaced from the bottom of the seating groove when the valve element is in a closed position so as to reduce the area of the valve element under compression and to reduce the torque required to close the valve element, said valve element when in a closed position being in sealing engagement with the valve seat due to the pressure of fluid prevailing in the inlet portion of the flow passage.

A still further object of the present invention is to provide a valve of the aforementioned type wherein the valve element is provided with a flange immediately above the yieldable sealing material for preventing rotation of the valve element in the chamber, the top portion of the yieldable sealing material adjacent the flange being provided with an annular groove so as to prevent extrusion of the sealing material caused by continued operation of the valve, said extrusion resulting from the material collecting around the top portion of the valve element and thereby impairing the functioning of the valve.

Another object of the present invention is to provide a valve element of the aforementioned type wherein indexable guide means is provided between the wall of the chamber and the flange of the valve element for preventing rotation of the valve element about its axis during normal opening and closing movement thereof, said guide means being constructed and arranged to provide for removal and replacement of the valve element in the chamber in a plurality of different angularly indexed positions to present different side portions thereof for cooperation with the valve seat.

Still another object of the present invention is to provide a valve of the aforementioned type wherein operating means including a threaded stem is provided for moving the valve element longitudinally with respect to the chamber and clearance is provided between the threads of the valve element and the stem to permit lateral shifting of the valve element towards the valve seat when in a lightly closed position in the passage in an amount effective to produce positive sealing between the sealing material and the valve seat.

Still another object of the present invention is to provide a valve of the aforementioned type wherein a bonnet is threadedly connected to the chamber and is provided with a centrally located aperture therein aligned with the chamber, an annular recess in the bonnet surrounding the aperture and terminating in a downwardly facing laterally stepped shoulder, said stem extending through the aperture into the chamber, an O-ring seal of transverse rectangular cross-section surrounding the stem and received in the recess, and a flange on the stem having the upper surface portion in engagement with the shoulder for holding the O-ring seal in the recess, the seal, shoulder and the last mentioned flange preventing leakage of fluid across the stem and the bonnet.

It is thus another object of this invention to provide a simplified low cost structure of the aforementioned type having certain advantages contributing to efficiency, reliability and long life as well as ease of maintenance.

Further objects and advantages of the present invention will be apparent from the following description, reference being had to the accompanying drawing wherein a preferred form of the present invention is clearly shown.

FIGURE 1 is a plan view, partly in section, of one embodiment of the invention, taken on the line 1—1, FIGURE 2.

FIGURE 2 is a sectional elevational view showing the valve in a closed position.

FIGURE 3 is an end view, partly in section, of the valve shown in FIGURES 1 and 2.

FIGURE 4 is a sectional elevational view showing the valve in an opened position.

FIGURE 5 is an elevational view of part of the valve, showing the body in section and the valve plunger in elevation and illustrating the manner in which the plunger seals on the downstream side thereof.

As previously mentioned, the valve under consideration is characterized by having combined in one valve the feature of straight through flow with an infinitely variable flow control.

Referring now to the drawing, the valve is represented by the numeral 10. The valve 10 includes a T-shaped body 12 having a straight through flow passage 16 therein which is provided with separated threaded inlet and outlet portions 17 and 18, respectively. An elongated chamber 14 is located in the body 12 principally at one side of the flow passage 16 intersecting the flow passage and extending beyond the other side of the flow passage 16. The chamber 14, where it intersects the flow passage 16, is of circular cross-section, and defines an annular shoulder or rim 19 having a diameter greater than the diameter of the flow passage 16. Said intersection also defines a seating groove 20 of concave circular cross-section below and at the sides of the flow passage 16. The downstream portions of the rim 19 and the seating groove 20 define a valve seat 21 which surrounds the intersection between the chamber 14 and the outlet portion 18 of the flow passage 16. The seating groove may be formed by utilizing a spherical reamer which is inserted through the chamber 14 to the wall of the body 12. The chamber has an internally threaded flanged end 24, and the lateral extension or portion of the chamber is of hexagonal cross-section. Threadedly inserted into the threaded end 24 of the chamber 14 is a bonnet or closure member 26 which carries a threaded valve stem 28 for rotation only. The stem 28 extends outwardly beyond the top of the bonnet 26 and has a spline 30 thereon for engaging a complementary portion of the handle 32. The handle 32 is connected to the reduced threaded end 35 of the stem 28 by a nut 34.

The stem 28 includes a shoulder portion 36 which abuts against the internal shoulder 38 of the bonnet 26 so as to define a bonnet cavity 40 which receives an O-ring 42 of transverse rectangular cross-section which is placed around a portion of the stem 28 to prevent leakage across the stem 28 and the bonnet 26. The valve stem 28 includes a threaded portion 44 which carries thereon a valve plunger assembly or elongated valve element 46 of circular cross-section. At least the surface portion of the valve element 46 is formed of a yieldable sealing material as will be subsequently described.

As previously mentioned, the lateral extension of the chamber 14 is so designed as to provide a hexagonal chamber 48 which provides means for preventing the rotation of the hexagonal valve insert or plunger 50 which forms part of the valve plunger assembly 46. The valve plunger assembly 46 is permitted to move axially in the chamber 14 toward and away from the seating groove 20. The area of the spherical seating groove 20 provides approximately three and one-half times as much seating area is a conventional globe or gate valve. This provides for positive shut-off and long life.

The valve plunger assembly or elongated valve element 46 includes the valve insert 50 and the resilient valve sealing cover or member 52. The insert 50 includes a hexagonal flange 54 and a hollow threaded portion 56 which has threads therein to match the threads on the stem 28. The lower portion 58 of the insert 50 is spherical and the side portions thereof have a slight outward taper. An annular groove 57 is cut around the top portion of the cover 52 immediately below the flange 54. Prior to the use of the annular groove 57 it was found that repeated operation of the valve in some situations caused an extrusion or "kneading" effect on the resilient material causing the material of the cover 52 to gather or collect around the top and thus impair the functioning of the valve. The material collected at the top of the cover 52 bulged outwardly and assumed a size larger than the circular opening or rim 19. It has now been found that the problem of extrusion has been eliminated by the provision of the groove 57. Any material collecting at the top of the cover 52 will tend to fill the annular groove 57 and thus avoid interfering with the opening or closing of the valve plunger assembly 46.

The resilient or yieldable cover 52 includes a coating of rubber or equivalent material such as natural or synthetic rubber, resin, Neoprene, Buna-N, Teflon, nylon or the like, which is bonded to the outer periphery of the insert 50. The inner surface of the lower portion 60 of the plunger cover 52 is also spherical to conform to the contour of the lower portion 58 of the insert 50. The outer and bottom surface 62 of the cover 52 is spaced from the bottom of the seating groove 20 when in a closed position. The surface 62 may be flat, as illustrated, or slightly conical to provide a very useful purpose. It has been found that the material such as Buna-N hardens with time, with the consequence that an increase in torque is required to close the valve. By flattening the end of the cover, the area thereof under compression is reduced with corresponding increases in the unit compression of the areas of the cover 52 still in sealing contact. The rubber covered valve plunger, gate or element 46 is in the form or shape of a heart and seats against the valve seat 21. It has been found that an increase in fluid pressure applied when the gate 46 is lightly closed deforms the yieldable sealing material and improves the seal as illustrated in FIGURE 5. The gate or heart plunger 46 operates on the O-ring principle. The gate 46 closes tighter as more line pressure is applied.

As previously mentioned, the flange 54 of the insert 50 is hexagonal and is prevented from rotating because of its location in the hexagonal chamber 48. Accordingly, rotation of the stem 28 causes the valve plunger assembly 46 to rise on the fast lead threads.

It should be observed when referring to FIGURES 2–5 that some clearance is provided between the hexagonal flange 54 and the wall defining the hexagonal chamber 48. The valve plunger assembly or elongated valve element 46 is arranged to have limited but definite lateral movement as movement from right to left or vice versa as seen in FIGUURE 2. This movement provides for tight sealing of the valve plunger assembly 46 under pressure applied by the fluid at the upstream side. With this arrangement, increase in pressure of fluid at the upstream side of the valve plunger assembly 46 increases the tightness of the seal.

Accordingly, a fairly hard but yieldable resilient material may be used as the cover 52. This is to be contrasted with an arrangement in which the tightness of the seal is determined primarily by the vertically downward force with which the valve plunger is urged against its seat, in which case, a softer resilient material is required, consequently having a shorter life.

The lateral bodily movement of the valve plunger assembly 46 may be due to deflection of the threaded stem 28, it being noted that when the valve is closed, the valve plunger assembly 46 is engaged only at the extreme lower end of the stem 28 and its major intermediate portion free to deflect. It may also be due to a clearance provided between the threads of the stem 28 and the plunger 50. In some cases, provision for the aforesaid lateral movement of the valve plunger assembly 46 may be by clearance in the mounting of the stem 28 in the bonnet 26.

The important feature is the provision by one or more of the above constructional arrangements for lateral movement of the valve plunger assembly 46 into tight sealing engagement with the valve seat 21 provided in the body 12 as a result of fluid pressure on the upstream side of the valve plunger assembly 46.

The aforesaid channel or seating groove 20 provided in the body 12 is of a transverse concave circular cross section. The pressure of fluid on the upstream side of the valve plunger assembly 46 is effective in the closed position thereof to laterally shift the valve plunger assembly 46 and press the yieldablbe cover 52 into tight sealing engagement with the valve seat 21.

When the valve stem 28 is rotated so as to move the valve plunger assembly 46 into a closed position in the flow passage 16, only a very small amount of manual force is required to seat the valve plunger assembly 46. The flow passage 16 is tightly sealed due substantially to the pressure of fluid on the upstream side of the valve plunger assembly 46. With such a construction, the valve operator does not have to force the valve plunger assembly against the groove so as to deform the yieldable cover to provide the requisite seal. All that is required is that the operator move the valve plunger assembly into a lightly closed position in the flow passage. The pressure of fluid deforms the yieldable cover 52 to provide the requisite sealing as mentioned previously.

For example, in FIGURE 5, it is noted that the depth of the aforesaid seating groove 20 of transverse concave circular cross section to the width of the groove is approximately in the ratio of 1:4. While this ratio is not sharply critical, it appears that for obtaining the full benefit, the "depth to width ratio" of the transversely extending arcuately shaped groove should not be less than the ratio of 1:6.

As previously mentioned, a feature of the invention is that the valve tends to eliminate "wire drawing" which is defined as a high velocity flow of jet liquid through a slightly open surface. Wire drawing tends to erode the surfaces of the valve or valve seats. In the present invention, the valve will open simultaneously around a 180-degree arc which tends to eliminate wire drawing.

In addition thereto, the yieldability of the rubber means that if pressure is allowed to reach a point between the normally engaged valve plunger and valve seat, the pressure will deform the rubber away from the valve seat and permit a larger flow of fluid. At the same time, the valve may be opened a very small amount to permit regulation or throttling.

This invention is an advance in the art wherein one valve combines the full flow characteristic of a conventional gate valve and the throttling feature of a conventional globe valve. The design precludes harmful distortion due to excessive pressure when the gate is closed. In addition, the design permits adequate sealing even though the body may be distorted by faulty installation.

Another unique feature is that the polygon body cross section permits the valve seat to be renewed several times by simply turning the seat radially in the body. In the case of a hexagonal body cross section, the body would be indexed 60 degrees. The body is rotated after the rubber cover has worn in one position. It is shifted to a new position to extend the life of the valve. This important feature is defined in the claim as indexable guide means provided between the wall of the chamber 14 and the valve element 46 for preventing rotation of the valve element 46 about its axis during normal opening and closing movement of the valve element 46. With such a construction the guide means is constructed and arranged to provide for removal and replacement of the valve element 46 in the chamber in a plurality of different angularly indexed positions to present different side portions thereof for cooperation with the valve seat 21.

The coated sealing element assures a seal similar to the action inherent in an O-ring. The greater the pressure, the better the seal within its working limits.

The design permits innumerable service applications simply by changing the composition of the sealing element, and in addition permits manufacturing processes which are less expensive than the difficult sealing operations on conventional gate valve bodies and wedges. The spherical valve may be produced with a simple reaming operation and provides means for stabilizing the valve. Also, wire drawing is eliminated due to the 180-degree opening plus the ability of the resilient cover to compress or deform when opened to partial flow.

The valve may be used wide open like any gate valve or continuously throttled from the smallest trickle to wide open flow. This is accomplished without vibration or clatter.

The drawing and the foregoing specification constitute a description of the improved valve in such full, clear, concise and exact terms as to enable any person skilled in the art to practice the invention, the scope of which is indicated by the appended claim.

What I claim as my invention is:

A valve comprising a body having a straight through flow passage which is provided with separated inlet and outlet portions and an elongated chamber located principally at one side of said flow passage intersecting said flow passage and extending beyond the other side of said flow passage to provide a seating groove below and at the sides of said flow passage, said chamber where it intersects said flow passage being of circular cross-section and being surrounded by an annular rigid rim which has a diameter greater than that of said flow passage, the portion of said seating groove at the bottom of said flow passage being spherically shaped and the portion of said seating groove at the sides being of concave circular cross-section, the portion of said chamber laterally of said flow passage being of non-circular configuration, a bonnet threadedly connected to said chamber and having a centrally located aperture therein aligned with said chamber, a stem carried by said bonnet for rotation only and extending through said aperture into said chamber, an elongated valve element of circular cross-section threadedly connected to said stem, said valve element including a flange of non-circular cross-section cooperating with said chamber for preventing rotation of said valve element about its axis during normal opening and closing movement thereof, said flange being spaced from said rim when the valve element is in a closed position, the lateral surface portion of said valve element below said flange having a valve cover thereon formed of a yieldable sealing material, the bottom of said cover being generally flat and spaced from the spherically shaped bottom of said seating groove when said valve element is in the closed position to reduce the torque required to close the valve element, a valve seat provided by a downstream surface portion of said seating groove surrounding the intersection between said seating groove and the outlet portion of said flow passage, said valve element being movable longitudinally in said chamber toward and away from a closed position in which said valve element engages and is pressed against said valve seat by the pressure of fluid prevailing in the inlet portion of said flow passage, the shape of said chamber and said flange permitting removal and replacement of said valve element in said chamber in a plurality of different angular indexed positions to present different side portions of said cover for cooperation with said valve seat, the top portion of said cover when the valve is in a closed position extending above the upper surface of said rim and abutting the under surface of said flange, and an annular groove in the top portion of said cover directly beneath said flange for receiving any of said sealing material displaced by downward pressure on the upper edge of said yieldable valve cover as said valve element is forced into closing position.

References Cited by the Examiner

UNITED STATES PATENTS

| 2,988,105 | 6/1961 | Soderberg et al. | 137—329.03 |
| 3,012,580 | 12/1961 | Rogers | 251—84 XR |

FOREIGN PATENTS

| 7,517 | 3/1892 | Great Britain. |
| 320,482 | 5/1957 | Switzerland. |

WILLIAM F. O'DEA, *Primary Examiner.*